US012097663B2

(12) United States Patent
Actis (10) Patent No.: US 12,097,663 B2
(45) Date of Patent: Sep. 24, 2024

(54) STRAP WELDING SYSTEM AND METHOD

(71) Applicant: H.W.J. DESIGNS FOR AGRIBUSINESS, INC., Clovis, CA (US)

(72) Inventor: Bradley P. Actis, Clovis, CA (US)

(73) Assignee: H.W.J. DESIGNS FOR AGRIBUSINESS, INC., Clovis, CA (US)

( * ) Notice: Subject to any disclaimer, the term of this patent is extended or adjusted under 35 U.S.C. 154(b) by 8 days.

(21) Appl. No.: 17/812,124

(22) Filed: Jul. 12, 2022

(65) Prior Publication Data

US 2023/0008423 A1 Jan. 12, 2023

Related U.S. Application Data

(60) Provisional application No. 63/220,899, filed on Jul. 12, 2021.

(51) Int. Cl.
| | |
|---|---|
| *B29C 65/06* | (2006.01) |
| *B29C 65/00* | (2006.01) |
| *B29K 101/12* | (2006.01) |
| *B29L 31/00* | (2006.01) |

(52) U.S. Cl.
CPC ........ *B29C 65/0681* (2013.01); *B29C 66/431* (2013.01); *B29C 66/834* (2013.01); *B29C 66/84* (2013.01); *B29K 2101/12* (2013.01); *B29L 2031/709* (2013.01)

(58) Field of Classification Search
CPC . B29C 65/0681; B29C 66/431; B29C 66/834; B29C 66/84; B29C 66/7392; B29L 2031/709; B29K 2101/12
See application file for complete search history.

(56) References Cited

U.S. PATENT DOCUMENTS

| | | | |
|---|---|---|---|
| 6,536,336 B1 * | 3/2003 | Jaenson | B65B 13/32 100/33 PB |
| 2013/0247515 A1 * | 9/2013 | Actis | B29C 66/4322 53/399 |

* cited by examiner

*Primary Examiner* — S. Behrooz Ghorishi
(74) *Attorney, Agent, or Firm* — Alumen IP Law PC (57) ABSTRACT

Strap welding system and method for welding two ends or sections of a strap around a bundle of articles or around a pressed bale. The strap welding system has a weld assembly for frictionally welding two ends of a plastic strap around a pressed bale. The weld assembly has a weld head with an upper weld jaw and a lower weld jaw, and wherein the lower weld jaw is supported, directly or indirectly, by a spring. A connecting piece for moving the lower weld jaw can optionally have a section with a connecting spring.

20 Claims, 9 Drawing Sheets

STRAP WELDING SYSTEM AND METHOD

FIELD OF ART

The present disclosure generally relates to an apparatus and method for automatically strapping bales of cotton, other fibers, or stacks of articles, such as lumber, bricks, shipping boxes, which are suitable for strapping. More specific discussions relate to a system and method for welding the ends of thermoplastic straps together so as to form strapped bales of cotton or any other desired materials or items. However, broader applications for the disclosed strap welding system are contemplated and covered by the instant invention.

BACKGROUND

In the cotton industry, the process of strapping a bale has been, for the most part, transitioned from using humans to manually tie bales to using automated machines to automatically strap bales. In the cotton or fiber industry, there are generally three ways in which to secure a bale after the bale has been pressed. These three ways include: pre-formed steel wires having interlocking ends, flat ribbon-steel bands having their ends inserted into a crimp and crimped and flat thermoplastic strapping material that are welded together.

Pre-formed steel wires may be tied by pivotally mounted wire bend assemblies which take the place of workers on each side of the baling press. The workers bend the tie wires around a bale by inserting the ends of the tie wires into a wire tie guide assembly. However, workers are still required to individually load each of a plurality of tie wires into the wire bend assemblies.

Bale tying using flat steel straps is hindered primarily by the cost of the strapping material, the complexity of the machinery used, and the speed at which the machinery is able to operate. In addition, the sheer weight of the steel strap tie material and its substantially sharp edges make the material cumbersome and dangerous to handle.

Conversely, plastic or other non-ferrous material is ideal for strapping bales of cotton or other fibers, or any package, stack of packages, or stack of materials to be consolidated. Plastic is relatively lightweight, can be formed into a variety of widths and thicknesses and has relatively soft edges, allowing for easy handling and lower shipping costs. Plastic or other non-ferrous strapping material is competitive with wire ties on a cost per bale basis and is easily adaptable to fully automatic tying machinery. Additionally, plastic or other non-ferrous strapping material is readily recyclable by the end user and is considered substantially safer than steel strapping material, particularly in instances of strap breakage.

Generally, automatic bale strapping device are categorized as up-packers, wherein baling chambers reside underneath the bale strapping device, often under the floor or ground, and down-packers, wherein baling chambers are located above the bale strapping device. Down-packers can also incorporate doors instead of enclosed bale chambers.

Down-packer-type presses are generally less expensive to purchase and install as much, if not all, of the work is done above ground. However, a down-packer-type press tends to give up some performance advantages, namely, cycle time or bales-per-hour.

Bale strapping systems for feeding straps over a pressed bale and then welding the two ends of each strap together to produce a strapped bale are well known. Exemplary bale strapping systems are disclosed in U.S. Pat. Nos. 7,841,272 and 6,536,336, the contents of which are expressly incorporated herein by reference for all purposes. A strapped bale typically has 6 or 8 straps. In practice, three serially connected bale strap assemblies in a bale strapping system can produce three straps at a time and then indexed to another section of the same bale to produce three additional straps for a total of six straps. For an eight-strap system, four bale strap assemblies are typically used with indexing to form eight straps. A bale strapping system may also include six or eight bale strap assemblies to produce all of the straps in the same strapping procedure.

As disclosed in the '272 and '336 patents, each bale strap assembly has numerous moving parts and parts that rotate about respective pivot pins. When these parts operate at high speed and cycle over and over during normal service, the parts can wear and sometimes prematurely if not correctly set or aligned.

SUMMARY

Apparatus and method for strapping a pressed bale are disclosed.

Aspects of the invention includes a method for welding two ends of a strap comprising: placing the two ends in between an upper weld jaw and a lower weld jaw and causing the upper and lower weld jaws to press the two ends; oscillating a connecting rod to cause the lower weld jaw to move so that a flat spring connected, directly or indirectly, to the lower weld jaw moves due to movement of the lower weld jaw; and forming a frictional weld at a location of the strap where the two ends are located between the upper and lower weld jaws.

The method can further include a second flat spring connected, directly or indirectly, to the weld jaw.

The connecting rod can be rotated by a drive end, which can include an eccentric pivot pin.

The method can further comprise a third flat spring forming part of the connecting rod.

The method wherein the upper weld jaw has a median line and wherein the strap forms a loop defining a loop plane is generally parallel to the median line.

The frictional weld can be a cross-weld.

An apparatus comprising a weld assembly, and wherein the weld assembly has at least one flat spring connected to a weld jaw. The weld assembly can be used for strapping a pressed bale or for non-bale-type applications.

A further aspect of the invention includes a method for welding two ends or sections of a strap together. The method can comprise placing the two ends or sections in between a first weld jaw and a second weld jaw and causing the first and second weld jaws to press the two ends or sections together; oscillating a connecting piece to cause the first weld jaw to move so that a flat spring connected, directly or indirectly, to the first weld jaw moves due to the movement of the first weld jaw; and forming a frictional weld at a location of the strap where the two ends or sections are located between the first and second weld jaws.

The flat spring can be a first flat spring and the method can further comprise a second flat spring connected, directly or indirectly, to the first weld jaw.

The connecting piece can be rotated by a drive end. The drive end can have a motor having a crank.

The connecting piece can comprise a third flat spring. For example, the third spring can be a connecting flat spring.

The second weld jaw can have a median line and wherein the strap forms a loop defining a loop plane that is generally parallel to the median line.

The frictional weld can be a cross-weld.

The connecting piece can have a lengthwise axis that moves generally perpendicular to the loop plane.

A still further aspect of the invention includes a method for welding two ends or sections of a strap comprising: placing the two ends or sections in between a first weld jaw and a second weld jaw and causing the first and second weld jaws to press the two ends or sections together; oscillating a connecting piece to cause the first weld jaw to move so that a flat spring connected, directly or indirectly, to the first weld jaw moves due to the movement of the first weld jaw; and wherein the second weld jaw has a median line and wherein the median line is generally perpendicular to or generally parallel to a lengthwise axis defined by the connecting piece.

The connecting piece can comprise a connecting flat spring located between the first weld jaw and a drive end comprising a motor.

The second flat spring can be generally parallel to the flat spring, which can be a first flat spring.

The first weld jaw can be rigidly connected to the connecting piece to restrict rotational and translational movement relative to the connecting piece.

The drive end can comprise a motor having a crank, a solenoid, a cylinder, or other devices that are configured to generate reciprocating motion.

The connecting piece can have a rigid arm.

A still further aspect of the invention includes a welding apparatus. The welding apparatus can comprise: a first weld jaw having a first weld surface, said first weld jaw connected to a connecting piece; a second weld jaw having a second weld surface that opposes the first weld surface; a flat spring having a first end connected to the first weld jaw and a second end connected to a structure; and wherein the first weld jaw is rigidly connected to the connecting piece, which has a first end and a second end.

A housing can be included. The housing can have a main housing section and a handle, and wherein the first and second weld jaws can be located, at least in part, in the housing.

The main housing section can comprise a primary main chamber and a secondary main chamber and a gap between the primary and secondary main chambers.

A rechargeable battery can be located in the housing, the rechargeable battery can be electrically connected to a motor for moving the connecting piece.

The connecting piece can comprise a connecting flat spring.

Methods of using and of making the welding apparatus and components thereof are within the scope of the invention.

BRIEF DESCRIPTION OF THE DRAWINGS

These and other features and advantages of the present device, system, and method will become appreciated as the same becomes better understood with reference to the specification, claims and appended drawings wherein:

DETAILED DESCRIPTION

The detailed description set forth below in connection with the appended drawings is intended as a description of the presently preferred embodiments of strap welding systems and related methods provided in accordance with aspects of the present disclosure and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

Figure 1:
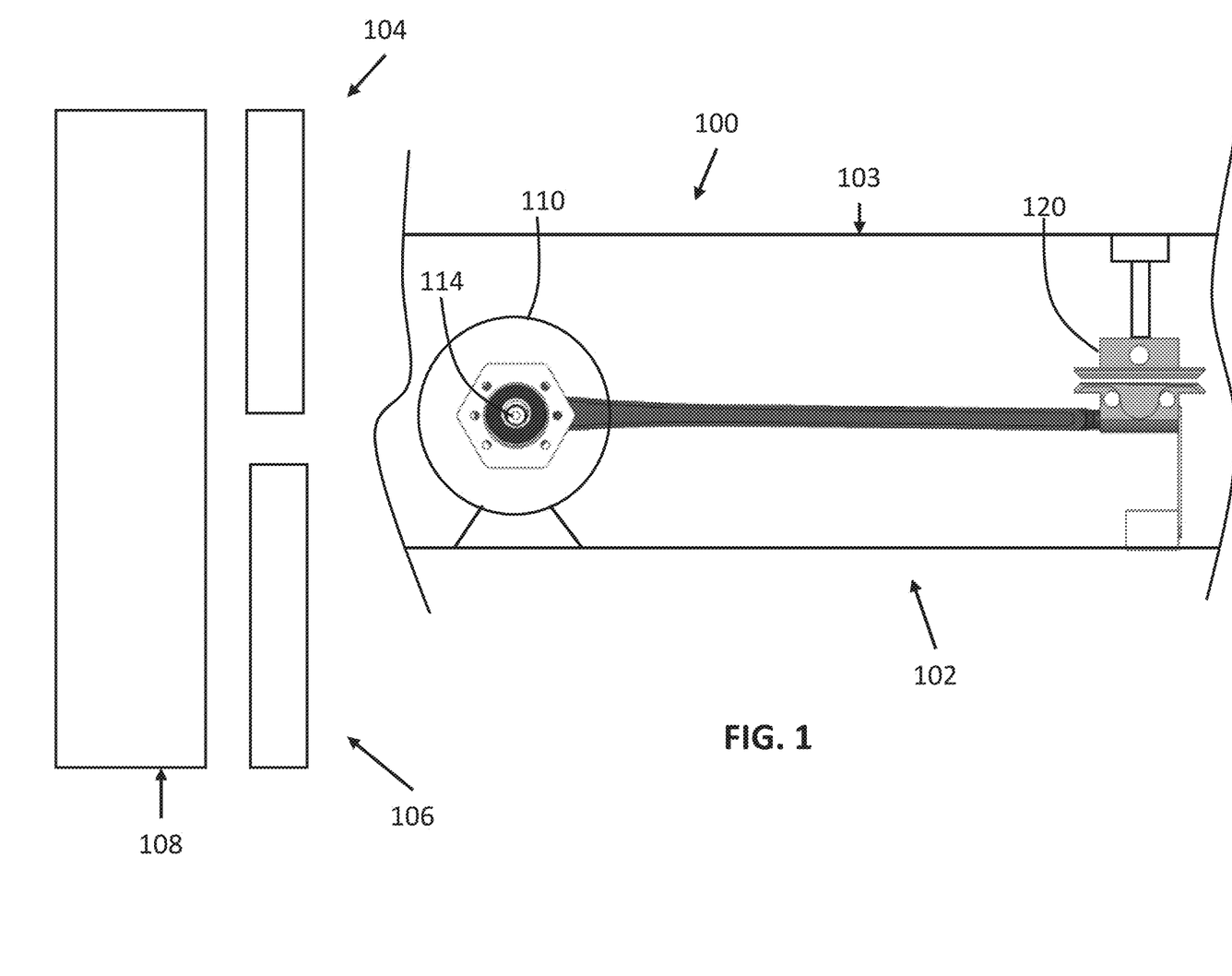
FIG. 1 is a schematic view of a bale strapping system for strapping a pressed bale.

With reference now to FIG. 1, a schematic side view of a bale strapping system is shown, which is generally designated 100. The bale strapping system can be broadly referred to as a strapping system for an article or a bundle of articles and extend beyond strapping pressed bales. For example, the bale strapping system may be adapted to strap a bundle of lumber, a pellet of boxes, or a crate containing loose articles, such as gears or supplies. Further, while the invention includes discussions on a bale strapping system, the concept is applicable to handheld or portable devices featuring aspects of the invention that are usable for welding straps for any use or industry.

In an example, the strapping system 100 can comprise three, four, six, or eight bale strap assemblies 102 (only one shown) in a side-by-side configuration. Each bale strap assembly 102 comprises a weld assembly 103 and a feeder assembly 104, also referred to as a load assembly, along with actuators, motors, rollers, brackets, channels, cutters, etc. for feeding straps around a pressed bale and for welding the two ends or sections of each strap together, as disclosed in the '272 and '336 patents but without the unique features of the present invention. The strap assemblies 102 can be mounted in a side-by-side arrangement on a frame assembly 106 for mounting the bale strapping system 100 onto a bale press machine 108, such as onto a base or platen of a down-packer or up-packer. The platen or base typically has slotted channels for receiving straps fed by the feeder assembly 104 and welded by the weld assemblies 103.

With reference now to FIGS. 2-5, a drive end 80 of a weld assembly 103 comprising a motor 110 having a crank 112 connected to an eccentric pivot rod or pin 114, which is then connected to a connecting rod or piece 116 (partially shown), are shown. When the crank 112 of the motor 110 is rotated, the offset end 114a of the eccentric pivot rod 114 moves through different offset positions relative to the axis of rotation of the crank 112, which is then used to create oscillating movement in the connecting rod 116. The motor end with the crank and eccentric pivot pin may be called the drive end 80.

Figure 2:
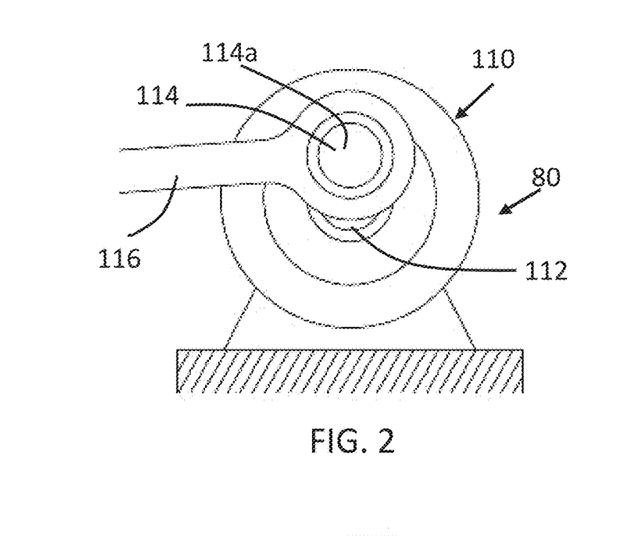
FIGS. 2-5 are schematic views of a drive end showing different positions of the offset end of the eccentric pivot pin driven by the crank of the drive end.
Figure 3:
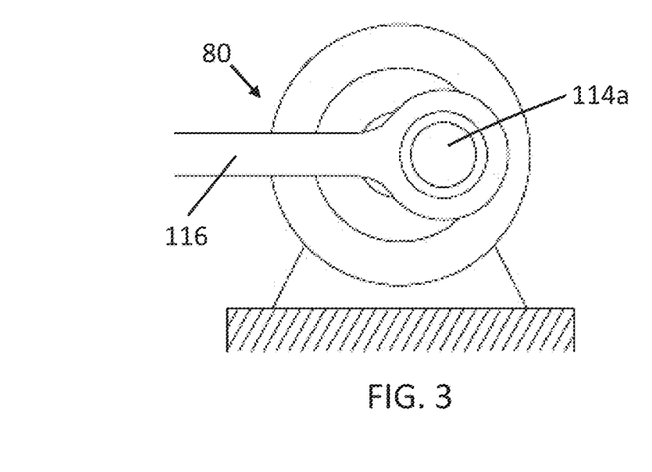
Figure 4:
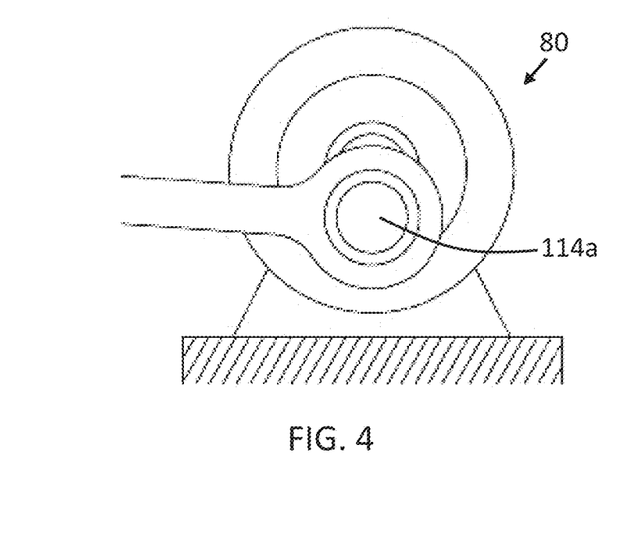
Figure 5:
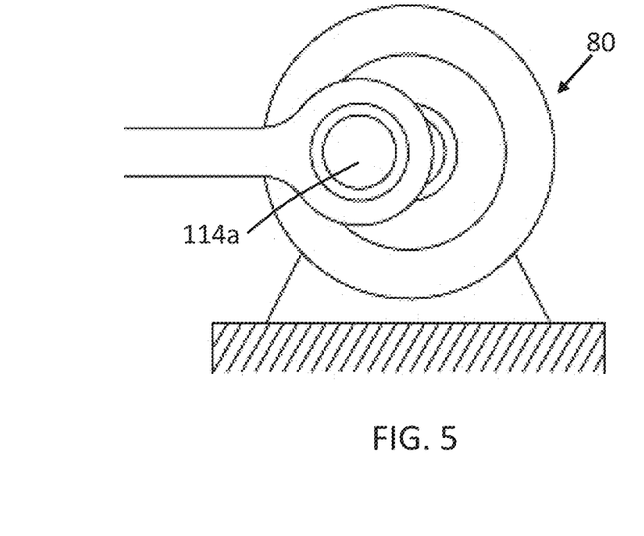

Using a 360-degree angle of a circle, the offset end 114a is shown moving through the 0-deg position in FIG. 2, the 90-deg position in FIG. 3, the 180-deg position in FIG. 4, the 270-deg position in FIG. 5, and then back to the 0-deg position of FIG. 2 for each rotation of the crank 112. Thus, the crank 112 rotates to produce oscillation movement in the eccentric pivot rod 114, which then produces back-and-forth translational movement in the connecting rod 116 via the connection to the offset end 1114a of the eccentric pivot rod 114. The connecting rod 116 therefore has a driven end that is pivotably connected to the offset end 1114a of the eccentric pivot rod 114. As further discussed below, this back-and-forth movement imparted to the connecting rod 116 by the crank 112 can then be used to weld two ends or sections of a strap together via friction weld. The motor 110, the eccentric pivot pin 114, and the connecting rod or piece 116 of FIGS. 2-5 are shown in FIG. 1, with the connecting rod 116 connected to a weld head 120.

Figure 6:
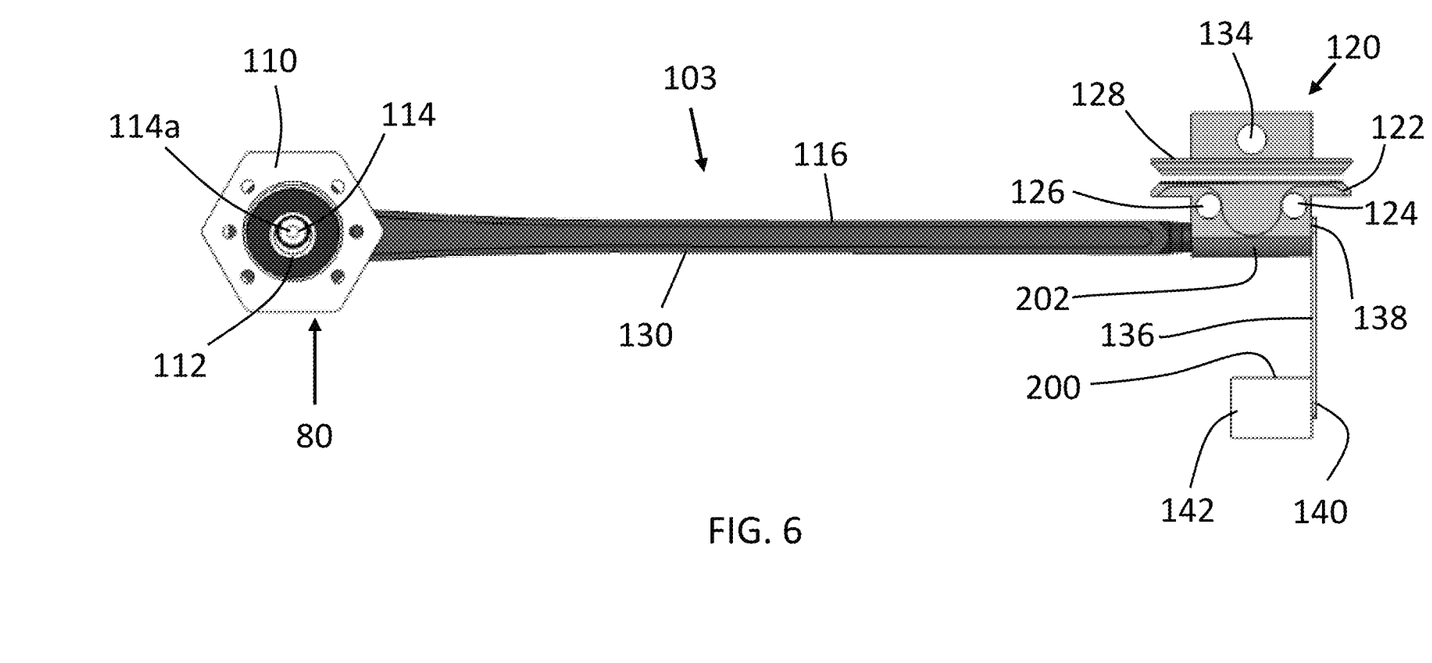
FIGS. 6-9 are schematic views of a weld assembly passing through different positions of the eccentric pivot pin in accordance with aspects of the invention.

With reference now to FIG. 6, the weld assembly 103 of FIG. 1 is shown in schematic. In an example, the weld assembly 103 comprises a weld head 120 comprising a lower weld jaw or first weld jaw 122 and an upper weld jaw or second weld jaw 128. The lower or first weld jaw 122 is connected to the connecting rod 116 via a pair of pins 124, 126 (fixed/bolt) without a wrist pin and the connecting rod 116 is connected to the eccentric pivot pin 114, which is connected to the crank 112 of the motor 110. The two pins 124, 126 fixedly secure the lower or first weld jaw 122 to the arm 130 of the connecting rod 116 from relative movement between the two. That is, the first weld jaw 122 is rigidly fixed to the arm of the connecting rod both rotationally and translationally. As the lower or first weld jaw 122 is fixed relative to the arm 130 of the connecting rod, it may also be referred to as a fixed weld jaw. In other examples, rather than using pins 124, 126 to fix the first weld jaw to the arm of the connecting rod, the first weld jaw can be bolted to the connecting rod.

In an example, the first weld jaw 122 has surface that faces or opposes the surface of the second weld jaw 128, which may be referred to as weld surfaces. Each of the two weld surfaces of the two weld jaws can have a plurality of small bumps or projections to grip the strap ends or sections located therebetween for welding. Less preferably, the weld surfaces of the two weld jaws are smooth. In some examples, the weld surfaces are separately formed from the first and second weld jaws and are attached to the bodies of the two respective weld jaws. The separately formed weld surfaces allow for adjustments and replacements without having to replace the entire weld jaws.

The upper or second weld jaw 128 is connected to a telescoping cylinder (not shown) via a pivot pin 134. When using the telescoping cylinder, the upper or second weld jaw 128 can move up and down to provide clearance for positioning and removing the straps from the weld head 120. In other examples, the upper or second jaw 128 is secured to a rigid structure and does not move up and down but the first or lower jaw can instead move up and down or rotate out of the way for positioning and removing straps from the weld head 120. As shown, the upper weld jaw 128 can rotate back and forth about the pivot pin 134 to accommodate the motion of the lower weld jaw 122 as the lower weld jaw translates back and forth by the arm 130 but the upper weld jaw 128 does not translate.

In an example, the first weld jaw 122 can translate back-and-forth a total distance of about 1/16-inches to about 1/8-inches at a rate of about 100-200 oscillations per second. The weld head 120 typically operates for about 1-4 seconds per weld cycle. However, these values are exemplary only and can vary depending on the materials used, the size of the welds, and the required strength of the welds, among others.

In use, two ends or sections of a strap or two strap ends can be placed between the two weld jaws 122, 128 and friction welded together. That is, using the oscillation movement of the lower weld jaw 122 and the fixed position of the upper weld jaw 128, two ends or sections of a plastic strap, such as a polyester strap or a nylon strap, located between the two weld jaws 122, 128 can be frictionally welded together by the oscillating rubbing motion of the lower or first weld jaw pressed against the upper or second weld jaw.

To cooperate with the back-and-forth movement of the connecting rod 116 imparted by the eccentric pivot pin 114 and to support the lower weld jaw 122, a flat spring 136 can be incorporated. The flat spring 136 can have two ends with the first end 138 connected, either directly or indirectly, to the lower weld jaw 122 and the second end 140 connected to a structure 142 of the weld assembly 103, which can be a base, a beam, a flange, or a frame. The flat spring 136 has properties or characteristics that allow the flat spring to flex back and forth when held fixed at one end by the structure 142 and subjected to translating motion at the opposite end, such as when caused to translate by the first weld jaw. Thus, the two ends 138, 140 of the flat spring 136 are secured to corresponding structures and the spring flexes back-and-forth due to movement of one of the two structures from which the spring is attached. Use of the flat spring 136 provides the additional benefit of stabilizing the weld head from lateral movement, in-and-out of the page of FIG. 6.

In an example, the second end 140 of the flat spring is stationarily fixed to the structure 142 while the first end 138, which is attached to the lower or first weld jaw 122, is pushed back-and-forth by movement of the first weld jaw 122, which is moved by the connecting rod 116. Thus, when the connecting rod 116 oscillates back-and-forth and moves the first or lower weld jaw 122 back-and-forth, the flat spring 136 also moves back-and-forth, via flexing back-and-forth, to accommodate movement of the lower weld jaw 122. Inherently as the flat spring 136 moves back-and-forth, the first end 138 of the flat spring 136 also moves up-and-down due to the arcing motion. Thus, if the weld surface of the first weld jaw 122 defines a referenced plane when at the zero degree position, the weld surface of the lower weld jaw 122 moves up and down from the referenced plane as the eccentric pivot pin 114 cycles through its 360-degree rotation and the flat spring 136 moves back and forth. In an example, the flat spring is made from a metal material, such as a ferrous or a non-ferrous material. The length, width, and thickness of the flat spring can be selected to ensure longevity and support for the lower jaw 122. In practice, a relatively longer flat spring will result in a lower deflection based on its elastic limit than a relatively short flat spring that deflects the same amount. Further, a smaller width and thinner flat spring compared to a wider and thicker flat spring will ensure that the spring will flex for a given frictional interface.

Without being bound to any particular theory, it is believed that by using a spring to support the first weld jaw, or the weld jaw that oscillates by the connecting rod, the flat spring is able to flex to absorb various vibrational forces and angular forces generated by the oscillating motion of the connecting rod and therefore improve the service life of the various parts of the weld assembly. For example, by using a spring to absorb vibrational and angular forces, it is believed that the amount of wear of wear plates is reduced. Further, by using a spring with elastic properties, one or more wrist pins can be eliminated as the spring itself can flex without wrist pins. Further, the spring is preferably operated well below its upper elastic limit, and preferably never exceeding its plastic limit, to prolong the service life of the spring. The spring can be a flat spring as discussed above or a coil spring, as further discussed below.

Although the term "flat spring" has been used in connection with element "136", the broader "spring" term may alternatively be used in that a helical extension spring or coil spring may be used instead of the flat spring. In other words, a coil spring having a first end may be coupled to the upper surface 200 of the structure 142 and the second end of the coil spring may be coupled to the lower surface 202 of the first weld jaw 122 to support the weld head 120 and the connecting rod 116. The spring 136, whether a flat spring, which may be called a leaf spring by some, or a coil spring, is sized and shaped to support the connecting rod and the weld head 120. Thus, the spring 136 should have sufficient rigidity to support the load of the connecting rod and the weld head in the lengthwise axial direction of the spring. Additionally, the spring should be sufficiently flexible and resilient to move from side to side while it supports connecting rod the weld head 120 as the first weld jaw 122 oscillates back-and-forth by the connecting rod, as further discussed below.

When a coil spring is used with the weld system of the present invention and while the coil spring can flex in multiple directions, the spring will only travel along a single plane, i.e., left to right and up and down of FIG. 6. The spring supports the weld head 120 and the connecting rod 116 and since the connecting rod, and the first weld jaw 122, only moves left-and-right of FIG. 6, the spring will also move left-and-right of FIG. 6 as the spring supports the first weld jaw 122. Theoretically, the end of the spring adjacent the lower weld jaw 122 will also move up and down as the spring cycles back and forth due.

Figure 7:
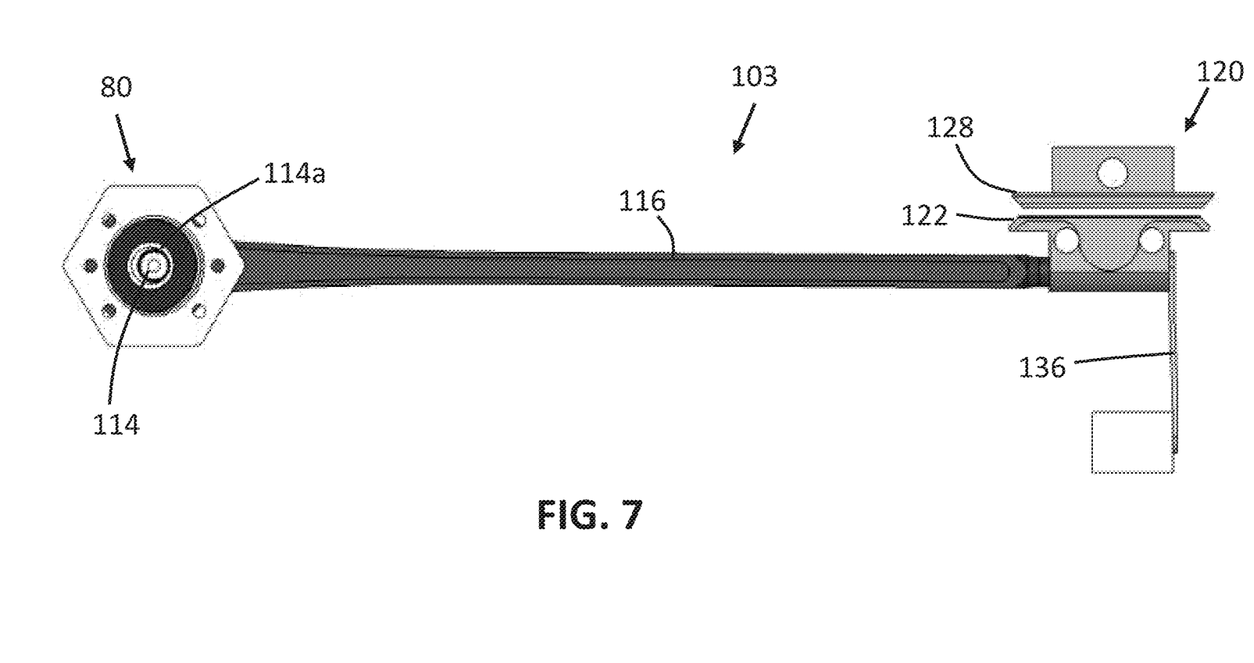

With reference now to FIGS. 7-9 in addition to FIG. 6, the weld assembly 103 is shown moving through one rotation of the eccentric pivot pin 114, which is also one rotation of the crank 112. Starting with FIG. 6, the offset end 114a (FIG. 2) of the eccentric pivot pin 114 is at the 0-deg position and the lower and upper weld jaws 122, 128 have median lines that generally align. FIG. 7 shows the offset end 114a of the eccentric pivot pin 114 at the 90-deg position and the first or lower weld jaw 122 moved to the right of the median line of the second upper weld jaw, approximately the same distance as the length between the two axes of rotation of the eccentric pivot pin 114. This movement of the connecting rod 116 causes the spring 136 to flex to the right of the plane of the spring when the spring is at the 0-deg position, which can be called a neutral plane.

Figure 8:
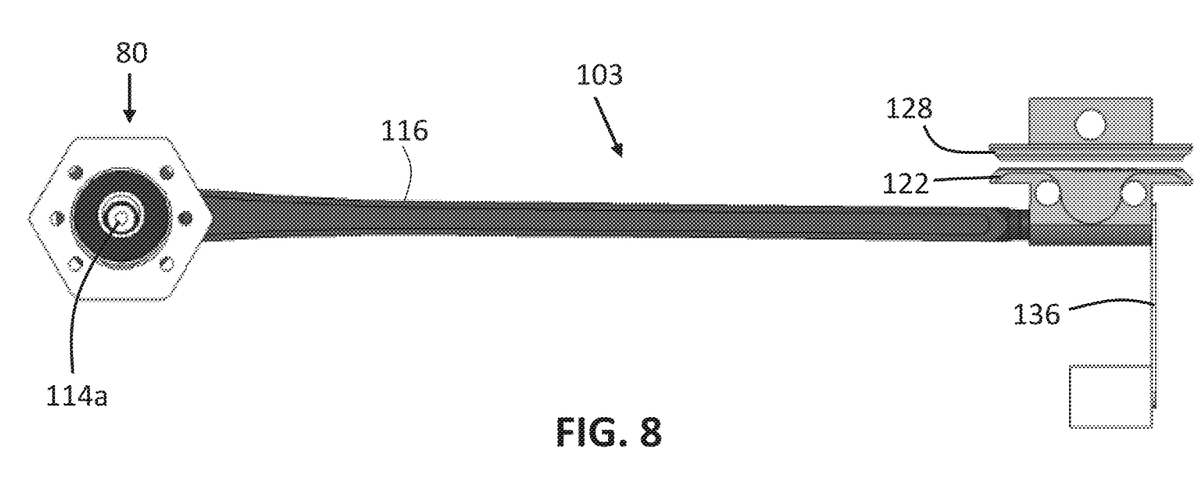

FIG. 8 shows the offset end 114a of the eccentric pivot pin 114 at the 180-deg position and the median lines of the lower and upper weld jaws again generally aligned. In this position, the spring 136 returns to the neutral plane.

Figure 9:
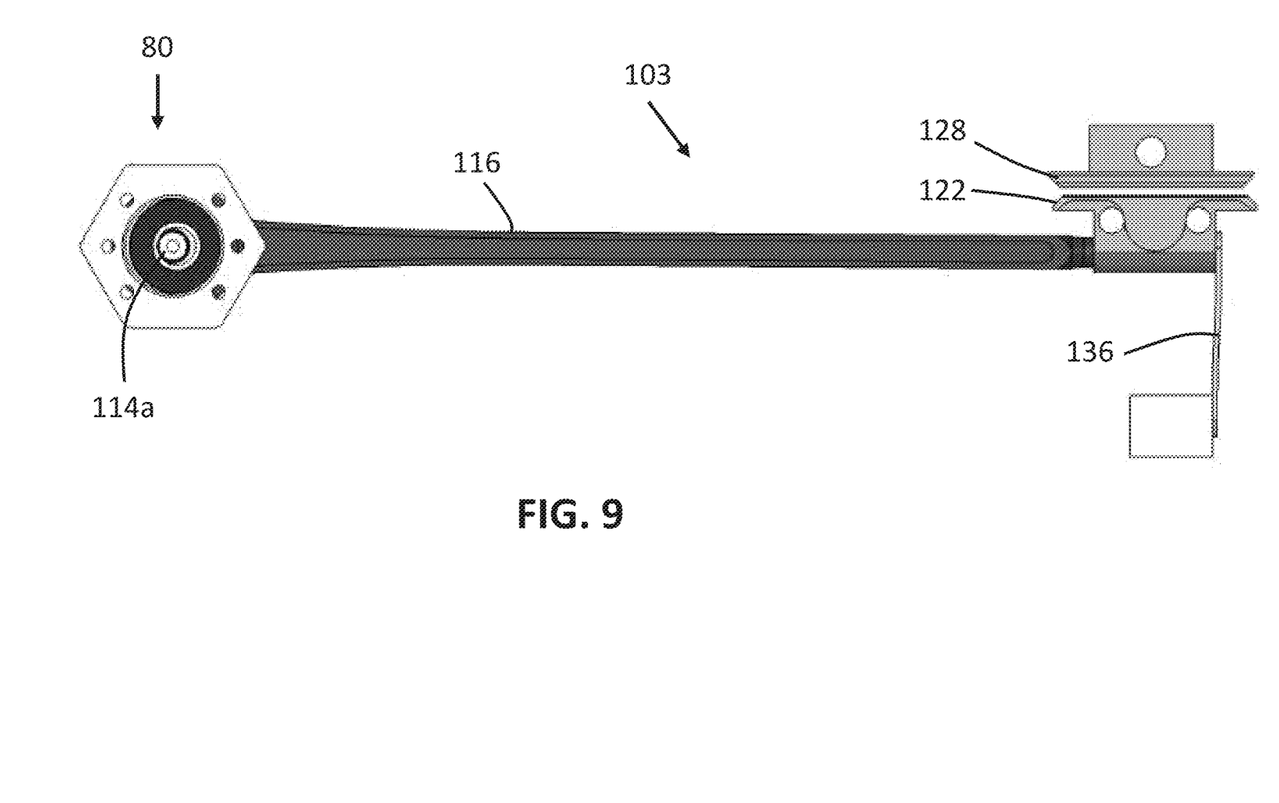

FIG. 9 shows the offset end 114a of the eccentric pivot pin 114 at the 270-deg position and the lower or first weld jaw 122 moved to the left of the median line of the upper or second weld jaw 128. This movement by the eccentric pivot pin causes the spring 136 to flex to the left, away from the neutral plane. Further rotation of the crank 112 will move the offset end 114a of the eccentric pivot pin 114 back to the 0-deg position and so forth.

Thus, using rotational energy of the motor, the lower or first weld jaw 122 can be caused to oscillate back-and-forth against the surface of the second or upper jaw 128. When two strap ends or sections are positioned between the two weld jaws 122, 128 and the lower weld jaw 122 oscillates back-and-forth, frictional rub by the two strap ends or sections will occur and heat will generate to partially melt the strap ends or sections, which can be nylon or polyester, to cause bonding or fusion, otherwise known as frictional welding. Thus, when used in the context of a bale strapper, the present weld assembly 103 with a weld head supported by a spring can be used to frictionally weld a bale strap around a pressed bale. Said differently, the weld assembly 103 of the present invention uses two weld jaws, called a first weld jaw and a second weld jaw, and a spring to support one of the two weld jaws and wherein oscillating motion is applied to generate heat to frictionally weld two trap ends or sections of a strap together to strap in an article, such as a pressed bale. In alternative examples, as previously discussed, the invention is capable of other applications, such as to weld straps to secure stacks of articles, such as lumber, bricks, shipping boxes, etc., to name a few non-limiting examples.

Thus, aspects of the present invention include a weld assembly comprising a drive end configured to generate translating motion, or back-and-forth motion, wherein the drive end is connected to a first end of a connecting rod to transfer back-and-forth motion to a first weld jaw that is connected to a second end of the connecting rod, and wherein the first weld jaw is supported by a spring such that back-and-forth motion of the first weld jaw corresponds to back-and-forth flexing motion of the spring. The invention further includes a second weld jaw and a weld interface between the first and second weld jaws. Two strap ends or strap sections of a strap can be located between the two weld jaws, at the weld interface, and can be welded together or to one another via friction weld generated by the first weld jaw oscillating back-and-forth against the pressure of the second weld jaw. The second weld jaw may be pivotably mounted so that the weld surface of the second weld jaw may oscillate back and forth about the pivot point.

In some examples, the translating motion of the drive end is produced by a rotating crank turning an eccentric pivot pin, as discussed herein. In alternative examples, a telescoping cylinder or piston, such as a solenoid, may be used to generate the translating motion. In still other examples, the weld assembly may be incorporated into a handheld device, which can use battery power or AC power to operate the motor housed in the handheld device for turning the drive end to then turn the connecting rod and move the first weld jaw relative to the second weld jaw located in the housing of the handheld device, as further discussed below.

Figure 10:
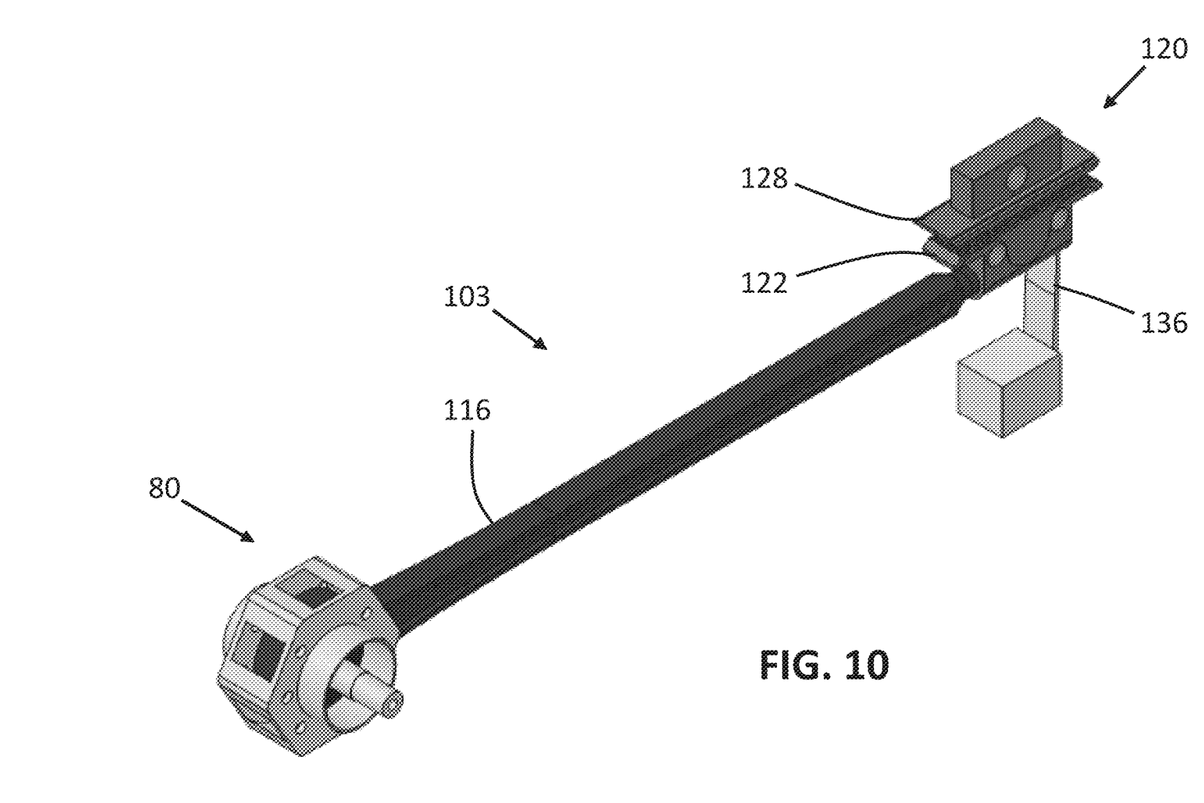
FIG. 10 is a perspective view of the weld assembly of FIGS. 6-9.

FIG. 10 is a perspective view of the weld assembly 103 of FIGS. 6-9.

Figure 11:
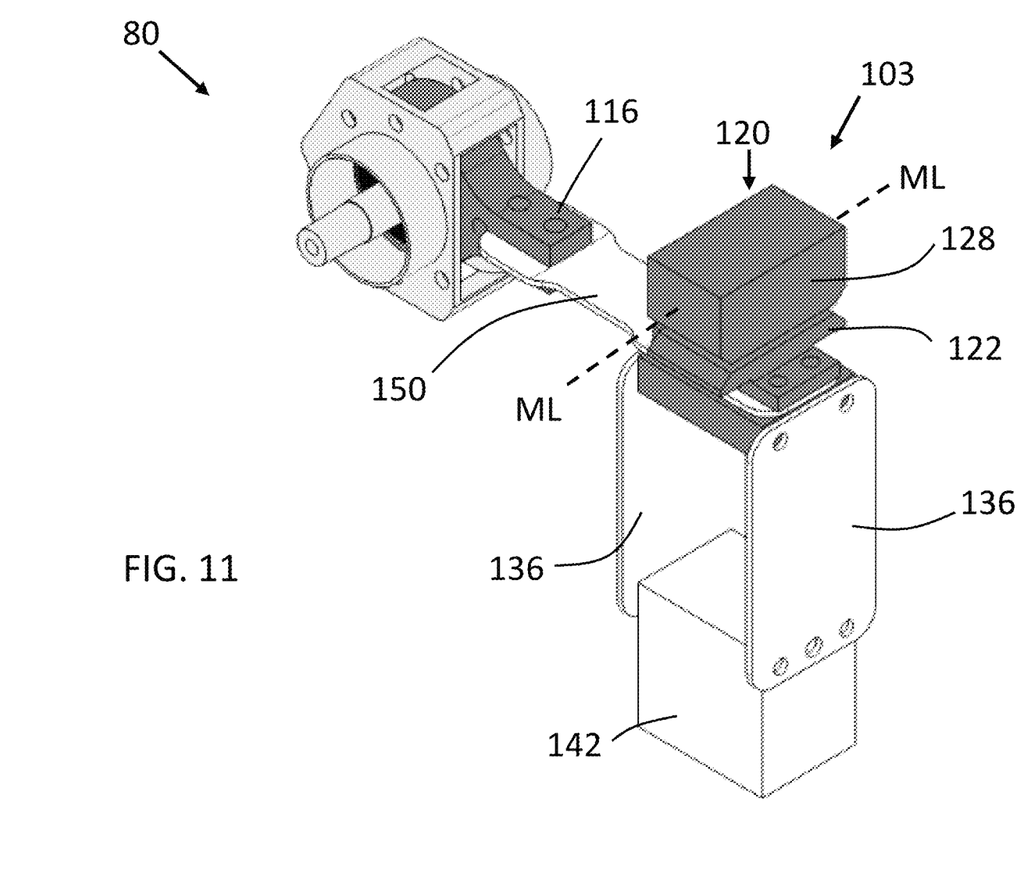
FIG. 11 is a perspective view of an alternative weld assembly provided in accordance with aspects of the invention.

With reference now to FIG. 11, a perspective view of an alternative weld assembly 103 provided in accordance with further aspects of the invention is shown. The present weld assembly 103 comprises a drive end 80, a connecting rod 116 connected to an eccentric pivot pin of the drive end 80 and to a weld head 120, which has a first or lower weld jaw 122 and a second or upper weld jaw 128, similar the embodiment of FIGS. 6-9. However, in the present embodiment, the connecting rod 116 has an arm that comprises at least one spring 150 so that forces generated by the drive end 80 can only be imparted to the first weld jaw or lower weld jaw 122 by translational movement of the spring 150, which may be called a connecting spring. In some examples, the connecting rod 116 is a solid connecting rod without the connecting spring 150, similar to the connecting rod of FIGS. 6-9. Whether practiced with a solid connecting rod or a connecting rod with a connecting spring, the structure that transfers motion from the motor to the weld head may be referred to as a connecting piece, which can be a solid arm or an arm section that has a connecting spring.

In the present embodiment, the second or upper weld jaw 128 is shown with a median line ML that is approximately orthogonal to the lengthwise axis of the connecting piece 116. The lower weld jaw 122 can have a median line that is oriented the same way as the upper weld jaw, or alternatively can be oriented in line or parallel with the lengthwise axis of the connecting piece 116. The weld head 120 of the present weld assembly 103 is configured to receive two ends or sections of a weld strap forming a loop and defining a loop plane with the loop plane oriented in the same direction, such as being generally parallel, as the median line ML of the second weld jaw 128. Thus, when the lower or second weld 122 oscillates, such as move back-and-forth as discussed above, to frictionally weld the two strap ends or sections of a strap together, the weld generated is a cross-weld that is formed by the transverse motion of the first jaw 122 relative to the loop plane.

With continued reference to FIG. 11, the first or lower weld jaw 122, which is mounted to a base or channel, is supported by two springs 136, 136. The two springs, which can both be mounted to the same frame structure 142 or to two different frame structures. Movements of the two springs 136, 136 are similar to the movement of the single spring 136 of FIGS. 6-9. In some examples, only one spring 136 is used with the present weld assembly 103 to support the lower or second weld jaw 122. Further, the single spring for supporting the weld head 120 and the connecting piece 136 can be a coil spring, as previously discussed. In still other examples, the weld assembly may be practiced with a single connecting spring 150 and wherein the weld head 120 is supported by a solid structure with a wrist pin, without a second spring.

Thus, aspects of the present invention are understood to include a weld assembly 103 and wherein the weld assembly can be practiced with one connecting spring 150 serving as a connecting piece and a solid support with a wrist pin for supporting the weld head. In another example, the weld assembly 103 can be practiced with one connecting spring 150 and one or two springs 136, 136 serving as support(s) for the first or lower weld jaw 122, which can be the weld jaw that is oscillated by the connecting piece. In another example, the weld assembly may be practiced with a solid arm as the connecting rod or piece, with one or two springs 136, 136 serving as support(s) for the first or lower weld jaw 122, and wherein the second weld jaw 128 has a median line ML that is orientated perpendicularly to the lengthwise axis of the connecting rod or piece.

Broadly speaking, the present invention includes a weld assembly having a weld head with a first weld jaw and a second weld jaw having a weld interface therebetween, a connecting piece connected to a drive end for oscillating the first weld jaw, and wherein at least one spring is directly or indirectly connected to the first weld jaw to support vibration and angular forces as the first weld jaw oscillates. The at least one spring can be a connecting spring that is connected to the drive end and the weld head or can be a support spring that supports the weld head, specifically the first weld jaw, and the connecting piece. The spring can be a coil spring or a flat spring, which is also known as a leaf spring. Preferably, where the connecting spring 150 and/or the support spring 136, or support springs 136, 136, is/are used, the spring(s) can be connected directly or indirectly to either move the first weld jaw and/or support the first weld jaw without the need for one or more wrist pins since the spring(s) can deflect.

In use, two weld ends or sections of a strap may be placed between the two weld jaws and frictionally welded together in the same manner as discussed above for the embodiment of FIGS. 6-10. The strap may be such a polyester strap or a nylon strap.

Figure 12:
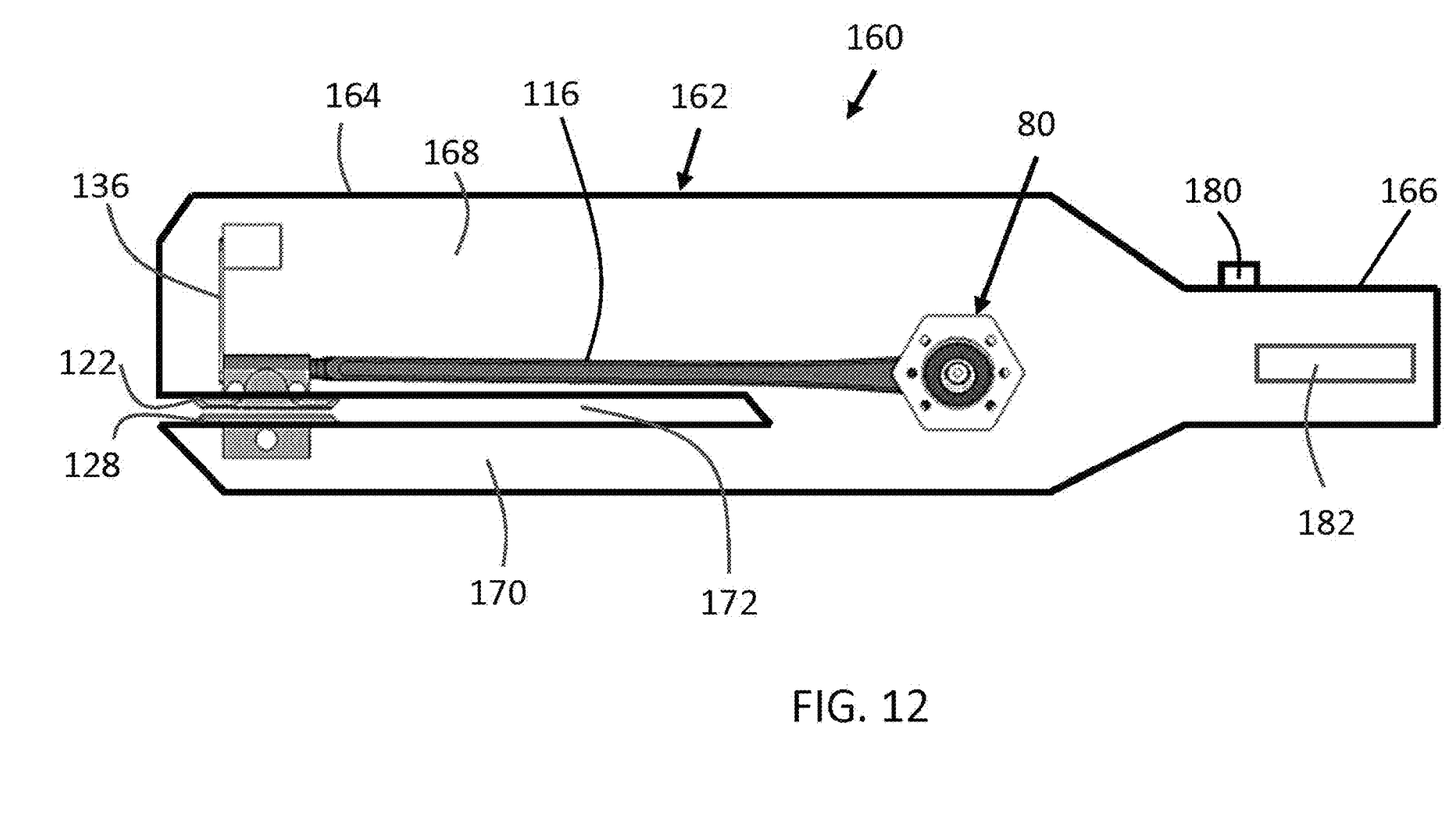
FIG. 12 is a schematic sideview of a handheld or portable weld assembly usable for frictionally welding two ends or two sections of a strap together.

With reference now to FIG. 12, a schematic view of a handheld tool or a portable tool 160 in accordance with aspects of the invention is shown. The handheld tool or portable 160 may be referred to as a handheld weld assembly incorporating aspects of the invention. The handheld tool is sized and shaped, such as being light and portable, for carrying from location to location by hand for use to weld two ends or sections of a strap together. As shown, the handheld tool 160 comprises a housing 162 having a main housing section 164 and a handle 166. The main housing section 164 is configured to house electrical and mechanical components of the weld assembly and the handle 166 is sized and shaped for gripping by one or both hands of a user during use to weld two ends or sections of a strap together.

In an example, the main housing section 164 comprise a primary main chamber 168 and a secondary main chamber 170 having a gap or channel 172 therebetween. An oscillating weld jaw or first weld jaw 122 is located, at least partially, within the primary main chamber 168 of the housing 162 and having a weld face or surface exposed at the gap 172. The non-oscillating weld jaw or second weld jaw 128 is located, at least partially, within the secondary main chamber 170 of the housing and having a weld face or surface exposed at the gap 172. The space between two exposed weld surfaces of the first and second weld jaws define a weld interface, which is configured to receive two strap ends or strap sections of a strap for welding the two together via friction weld.

Similar to the weld assembly of FIGS. 6-10, the first weld jaw 122 can be supported by a spring 136, which can attach to a structure 142 at one end of the spring and to the first weld jaw 122 at the opposite end of the spring. The structure 142 can be a frame or flange of the housing, which is preferably rigid and non-translatable. The spring 136 is configured to flex and oscillate to support the first weld jaw 122 as the first weld jaw is translated by the connecting rod or piece 116, which is connected at one end to the first weld jaw 122 and the opposite end to an eccentric pivot pin, which is then connected to a crank of a motor at the drive end 80. As previously discussed, when the motor is operated, the crank rotates the eccentric pivot pin which then moves the connecting rod 116 back-and-forth to move the first weld jaw 122 back-and-forth to generate friction between two strap ends or strap sections of a strap located between the first and second weld jaws to cause welding of the two strap ends or sections by friction.

In an example, an on/off button 180 is provided with the housing 162, such as near the handle 166, to energize the motor at the drive end 80 to then oscillate the connecting piece 116. The motor can be powered by a battery 182, which can be a rechargeable battery, or can be powered by AC power. In some example, a separate button is provided to activate a piston, actuator, or motor to move the second weld jaw or the first weld jaw to separate the two weld jaws and provide clearance for receiving and/or removal of the two strap ends or strap sections of a strap from the weld head.

The handheld 160 device of FIG. 12 is adapted for gripping or grasping to weld two strap ends or strap sections of a strap together to strap down a bundle or stack of materials, such as a bundle of boxes, of lumber materials, or garden materials, to name a few non-limiting examples. A user can simply place two strap ends or strap sections in between the two weld jaws 122, 128, at the gap or channel 172 of the handheld device 160 and then press the power button 180 to generate a friction weld at the weld interface.

In an example, two ends of a strap can be placed between the upper weld jaw and the lower weld jaw and wherein the loop formed by the strap is located around an article or around a bundle of articles, such as box, a stack of lumber, a stack of pallets, a stack of boxes, etc.

Methods of using and of making the weld assembly or system described elsewhere herein are within the scope of the present invention.

Although limited embodiments of strap welding systems and related methods and their components have been specifically described and illustrated herein, many modifications and variations will be apparent to those skilled in the art. Accordingly, it is to be understood that the strap welding systems and related methods and their components constructed according to principles of the disclosed device, system, and method may be embodied other than as specifically described herein. The disclosure is also defined in the following claims.

What is claimed is:

1. A method for welding two ends or sections of a strap comprising:
   placing the two ends or sections in between a first weld jaw and a second weld jaw and causing the first and second weld jaws to press the two ends or sections together;
   oscillating a connecting piece, which has a drive end to be driven by a driver and a driven end opposite the drive end, to cause the first weld jaw at the driven end to move so that a spring, which has a first end and a second end, moves due to the movement at the driven end;
   forming a frictional weld at a location of the strap where the two ends or sections are located between the first and second weld jaws; and
   wherein the first end of the spring is connected directly or indirectly to the first weld jaw at the driven end of the connecting piece and the second end is connected to a structure spaced from the connecting piece such that the spring flexes when the first weld jaw moves.

2. The method for welding of claim 1, wherein the spring is a first spring and further comprising a second spring connected, directly or indirectly, to the first weld jaw at the driven end of the connecting piece.

3. The method for welding of claim 2, wherein the connecting piece is rotated by the drive end and wherein the spring supports the connecting piece and the first weld jaw.

4. The method of claim 1, wherein the connecting piece is rotated by the drive end and the spring is connected to the connecting piece.

5. The method of welding of claim 1, wherein the second weld jaw has a median line and wherein the strap forms a loop defining a loop plane that is generally parallel to the median line.

6. The method of welding of claim 5, wherein the frictional weld is a cross-weld.

7. The method of welding of claim 5, wherein connecting piece has a lengthwise axis that moves generally perpendicular to the loop plane.

8. A method for welding two ends or sections of a strap comprising:
   placing the two ends or sections in between a first weld jaw and a second weld jaw and causing the first and second weld jaws to press the two ends or sections together;
   oscillating a connecting piece having a drive end to be driven by a driver and a driven end opposite the drive end to cause the first weld jaw to move so that a spring, which has a first end and a second end, moves due to the movement at the driven end;
   wherein the second weld jaw has a median line and wherein the median line is generally perpendicular to or generally parallel to a lengthwise axis defined by the connecting piece; and
   wherein the first end of the spring is connected directly or indirectly to the first weld jaw at the driven end of the connecting piece and the second end is connected to a structure spaced from the connecting piece such that the spring flexes when the first weld jaw moves.

9. The method of claim 8, wherein the connecting piece comprises a connecting spring located between the first weld jaw and the drive end.

10. The method of claim 9, wherein the drive end comprises a motor having a crank or a solenoid.

11. The method of claim 8, further comprising a second spring connected, directly or indirectly, to the first weld jaw at the driven end of the connecting piece.

12. The method of claim 11, wherein the second spring is generally parallel to the spring.

13. The method of claim 11, wherein the first weld jaw is rigidly connected to the connecting piece to restrict rotational and translational movement relative to the connecting piece.

14. The method of claim 8, wherein the connecting piece is a rigid arm.

15. A welding apparatus comprising:
   a first weld jaw having a first weld surface, said first weld jaw connected to a connecting piece having a drive end and a driven end;
   a second weld jaw having a second weld surface that opposes the first weld surface;
   a weld interface between the first weld surface and the second weld surface sized and shaped to receive two ends or two sections of a strap;
   a spring having a first end and a second end located at the driven end of the connecting piece; and
   wherein the first end of the spring is connected directly or indirectly to the first weld jaw at the driven end of the connecting piece and the second end is connected to a structure spaced from the connecting piece such that the spring flexes when the first weld jaw moves.

16. The welding apparatus of claim 15, further comprising a housing having a main housing section and a handle, and wherein the first and second weld jaws are located, at least in part, in the housing.

17. The welding apparatus of claim 16, wherein the main housing section comprises a primary main chamber and a secondary main chamber and a gap between the primary and secondary main chambers.

18. The welding apparatus of claim 16, further comprising a rechargeable battery located in the housing, the rechargeable battery electrically connected to a motor for moving the connecting piece.

19. The welding apparatus of claim 15, wherein the spring is a flat spring.

20. The welding apparatus of claim 15, wherein the spring supports the connecting piece and the first weld jaw and the spring flexes by motion of the first weld jaw.

* * * * *